United States Patent
Purcell et al.

(10) Patent No.: US 6,950,150 B2
(45) Date of Patent: Sep. 27, 2005

(54) METHOD AND A PROCESSOR FOR PROCESSING TWO DIGITAL VIDEO SIGNALS CLOCKED BY RESPECTIVE CLOCK SIGNALS OF IDENTICAL FREQUENCY BUT WITH A CONSTANT PHASE SHIFT THEREBETWEEN

(75) Inventors: John Patrick Purcell, Limerick (IE); Brian S. Carroll, Mullingar (IE); Anthony Scanlan, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 534 days.

(21) Appl. No.: 10/165,880

(22) Filed: Jun. 10, 2002

(65) Prior Publication Data

US 2003/0052998 A1 Mar. 20, 2003

Related U.S. Application Data

(60) Provisional application No. 60/297,369, filed on Jun. 11, 2001.

(51) Int. Cl.⁷ .............................. H04N 9/64; H04N 5/04
(52) U.S. Cl. ....................... 348/720; 348/441; 348/501; 348/512
(58) Field of Search ................................ 348/720, 721, 348/441, 501, 512, 536, 538, 542, 554; 341/61; 327/113, 119, 141

(56) References Cited

U.S. PATENT DOCUMENTS 5,227,863 A * 7/1993 Bilbrey et al. .............. 348/578
5,526,051 A * 6/1996 Gove et al. ............. 375/240.01
5,740,092 A * 4/1998 Miyake et al. ............... 708/522
5,751,375 A * 5/1998 Ninomiya et al. ........... 348/571
5,815,696 A * 9/1998 Tanaka et al. ............... 712/233
6,188,381 B1 * 2/2001 van der Wal et al. ........ 345/581

* cited by examiner

Primary Examiner—Victor R. Kostak
(74) Attorney, Agent, or Firm—Iandiorio & Teska

(57) ABSTRACT

A method and a processor for processing two digital video signals clocked by respective clock signals of identical frequency but with a constant phase shift therebetween. Standard definition and progressive scan digital video signals which are clocked at first and second clock signals CLOCK_1 and CLOCK_2, respectively, of identical frequency with a constant phase shift therebetween are interfaced with a processing circuit (7) by an interface circuit (10). The progressive scan signal is clocked into a first register (20) on the second clock signal CLOCK_2, and is clocked to a second register (21) by the first clock signal CLOCK_1 and in turn to a third register (22) by the first clock signal CLOCK_1. The edge of the first clock signal CLOCK_1 on which the progressive scan signal is clocked into the second register (21) is chosen to allow sufficient time to clock the signal. The standard definition signal is clocked through fourth, fifth and sixth registers (23, 24, 25), respectively, and both signals are clocked from the third and sixth registers (22, 25) on the first clock signal CLOCK_1 into the processing circuit (7).

26 Claims, 2 Drawing Sheets

METHOD AND A PROCESSOR FOR PROCESSING TWO DIGITAL VIDEO SIGNALS CLOCKED BY RESPECTIVE CLOCK SIGNALS OF IDENTICAL FREQUENCY BUT WITH A CONSTANT PHASE SHIFT THEREBETWEEN

This application claims the benefit of Provisional application Ser. No. 60/297,369, filed Jun. 11, 2001.

A method and a processor for processing two digital video signals clocked by respective clock signals of identical frequency but with a constant phase shift therebetween.

FIELD OF THE INVENTION

The present invention relates to a method for processing respective first and second digital video data signals which are clocked by respective first and second clock signals of identical frequency and having a constant phase relationship, and in particular, the invention relates to such a method which facilitates simultaneous processing of the first and second digital video data signal using a single clock signal. The invention also relates to a video signal processor for processing such first and second digital video data signals simultaneously using a single clock signal.

BACKGROUND TO THE INVENTION

In many jurisdictions it is desirable to provide for processing of digital video data signals in different formats in the same video signal processing unit. Such video signal processing units, in general are implemented in the form of one or more signal processing integrated circuit chips. However, whether the video signal processing unit is provided with one or more signal processing chips, in general it is necessary that the video data signals in the different formats be processed simultaneously. Implementing a video signal processing unit in the form of a number of signal processing chips lends itself more readily to simultaneous processing of different format video data signals, than do implementations which include only one single video signal processing chip. Although, video signal processing chips capable of simultaneous processing of different format video data signals are known, however, in general, since the various different format video data signals are clocked by different clock signals, separate clock signals are required for processing the respective different format video data signals. This leads to duplication of frequency multipliers which are required for multiplying the frequency of the clock signals for Interpolation of the video data signals. A separate frequency multiplier is required for each format video data signal. Since frequency multipliers tend to require a relatively large die area in an integrated circuit, excessive die area is, in general, required to accommodate the frequency multipliers.

In general, the three most common video data signal formats are standard definition format, progressive scan format and high definition format. The standard definition format is also referred to as interlace data format. In general, video data signals in standard definition are clocked at 13.5 Hz, while video data signals in progressive scan format are clocked at 27 MHz. High definition format video data signals are clocked at a higher frequency of 74.25 Mhz. However, these frequencies may vary. Indeed, it is known to have standard definition format signals clocked at frequencies between 12 MHz and 14.75 MHz, while progressive scan format signals may be clocked at frequencies of up to 29 MHz. The clock frequency for high definition format signals can range between 70 MHz and 82 MHz. Standard definition format signals may be provided in any of the following standards PAL, NTSC and SECAM, progressive scan format signals may be provided in 525P and 625P standards, while high definition format signals may be provided in 1010I, 720P and 1250I standards.

Accordingly, where a video signal processing unit is implemented as a single chip which comprises separate processing circuits, one for processing the video data signals of standard definition, another for processing video data signals in progressive scan and a third processing circuit for processing high definition format video data signals a separate clock multiplier circuit is required for each video signal processing circuit.

While the clock signals of standard definition and progressive scan format appear to be of different frequency, in general, the standard definition format clock signal can be brought up to an identical frequency to that of the progressive scan clock signal, although a phase difference may exist between the two identical clock frequencies. This phase difference, however, remains constant. However, because of the fact that the clock signals of the respective standard definition and progressive scan format video data signals are out of phase, separate frequency multiplying circuitry is required for multiplying the respective clock frequencies of the clock signals of the respective standard definition and progressive scan video signals in the respective video data signal processing circuits for interpolating the video data signals. This is inconvenient, and as discussed above leads to additional die area, which in turn leads to additional expense in the production and fabrication of such integrated circuit chips. The problem is particularly critical where it is desired to provide a single integrated circuit chip with processing circuitry for standard definition format signals and processing circuitry for progressive scan format video data signals, since in such cases die area is at a premium, and the requirement to provide separate frequency multiplying circuits for multiplying the clock frequencies of the respective clock signal for facilitating processing of the respective format video data signals in the respective video data signal processing circuits is particularly problematical.

There is therefore a need for a method for processing respective first and second digital video data signals which are clocked by respective first and second clock signals of identical frequency and having a constant phase relationship, and in particular, there is a need for a method which facilitates simultaneous processing of standard definition and progressive scan digital video data signal using a single clock signal. There is also a need for a video signal processor for processing respective first and second digital video data signals which are clocked by respective first and second clock signals of identical frequency and having a constant phase relationship, and in particular, there is a need for such a video signal processor which facilitates simultaneous processing of the standard definition and progressive scan digital video data signal using a single clock signal.

The present invention is directed towards providing such a method and a video signal processor.

SUMMARY OF THE INVENTION

According to the invention there is provided a method for processing respective first and second digital video data signals in a video signal processor, wherein the first video data signal is clocked by a first clock signal, and the second video data signal is clocked by a second clock signal, the first and second clock signals being of identical frequency and having a constant phase relationship, the method comprising the steps of:
clocking the first video data signal into an interface circuit by the first clock signal on either the rising edges or the falling edges thereof,
clocking the second video data signal into the interface circuit by the second clock signal on either the rising edges or the falling edges thereof,
clocking the first video data signal from the interface circuit to the video signal processor by the first clock signal on either the rising edges or the falling edges thereof,
clocking the second video data signal from the interface circuit to the video signal processor by the first clock signal on the ones of the rising edges or falling edges thereof similar to the edges of the first clock signal on which the first video data signal is clocked from the interface circuit to the video signal processor so that interpolation of both the first video data signal and the second video data signal can be carried out in the video signal processor with a frequency multiple of the first clock signal.

In one embodiment of the invention the first video data signal is one of a standard definition video data signal, and a progressive scan video data signal, and the second video data signal is the other of the standard definition video data signal and the progressive scan video data signal.

In another embodiment of the invention the first video data signal is a standard definition video data signal, and the second video data signal is a progressive scan video data signal.

In a further embodiment of the invention the frequency of the first and second clock signals lie in the range 24 MHz to 38 MHz. In general, the frequency of the first and second clock signals are approximately 27 MHz.

In one embodiment of the invention the first video data signal is clocked from the interface circuit to the video signal processor on the ones of the rising edges or the falling edges similar to the edges of the first clock signal on which the first video data signal is clocked by the first clock signal to the interface circuit.

In another embodiment of the invention the interface circuit comprises a first temporary storing register and a second temporary storing register, the second video data signal being clocked into the first temporary storing register by the second clock signal, and being clocked from the first temporary storing register to the second temporary storing register on the rising edges or the falling edges of the first clock signal, the ones of the rising edges or the falling edges of the first clock signal on which the second video data signal is clocked from the first temporary storing register to the second temporary storing register being selected to provide sufficient set-up time and hold time for the second video data signal to be clocked from the first temporary storing register to the second temporary storing register.

Preferably, the second video data signal is clocked from the first temporary storing register to the second temporary storing register by the first clock signal on the edges thereof which are opposite to the edges of the second clock signal on which the second video data signal is clocked into the first temporary storing register when the phase shift between the first and second clock signals lies within plus or minus a predetermined phase shift.

In one embodiment of the invention the predetermined phase shift is within plus or minus one-third of one cycle of the first clock signal. Preferably, the predetermined phase shift is within plus or minus a quarter of one cycle of the first clock signal.

In one embodiment of the invention the second video data signal is clocked from the second temporary storing register to a third temporary storing register prior to being clocked into the video signal processor, the second video data signal being clocked from the second temporary storing register to the third temporary storing register by the first clock signal on the ones of the rising or falling edges thereof similar to the rising or falling edges of the first clock signal on which the first video data signal is clocked into the video signal processor, the second video data signal being clocked from the third temporary storing register to the video signal processor.

In another embodiment of the invention the second video data signal is clocked into the first temporary storing register by the second clock signal on the rising edges or the falling edges thereof similar to the edges of the first clock signal on which the first video data signal is clocked into the video signal processor.

Preferably, the first video data signal is clocked through a plurality of temporary storing registers in the interface circuit by the first clock signal on the edges of the first clock signal similar to the edges of the first clock signal on which the first video data signal is clocked into the video signal processor, the number of temporary storing register through which the first clock signal is clocked in the interface circuit corresponding to the number of temporary storing registers in the interface circuit through which the second clock signal is clocked.

Additionally the invention provides a video signal processor for processing respective first and second digital video data signals, the first video data signal being clocked by a first clock signal, and the second video data signal being clocked by a second clock signal, the first and second clock signals being of identical frequency, and having a constant phase relationship, the video signal processor comprising:
a video signal processing circuit for interpolating the first and second video data signals,
a frequency multiplier in the video signal processing circuit for multiplying the frequency of a clock signal for interpolating the first and second video data signals in the video signal processing circuit, and
an interface circuit for interfacing the respective first and second video data signals with the video signal processing circuit, the first video data signal being clocked into the interface circuit by the first clock signal on the rising or falling edges thereof, and subsequently being clocked from the interface circuit to the video signal processing circuit by the first clock signal on the rising or falling edges thereof, the second video data signals being clocked into the interface circuit by the second clock signal on the rising or falling edges thereof, and subsequently being clocked from the interface circuit to the video signal processing circuit by the first clock signal on the ones of the rising or falling edges thereof similar to the rising or falling edges of the first clock signal on which the first video data signal is clocked from the interface circuit to the video signal processing circuit so that interpolation of both the first video data signal and the second video data signal can be carried out in the video signal processing circuit with a frequency multiple of the first clock signal derived from the first clock signal by the frequency multiplier.

In one embodiment of the invention the interface circuit comprises a first temporary storing register and a second temporary storing register, the second video data signal being clocked into the first temporary storing register by the second clock signal, and being clocked from the first temporary storing register to the second temporary storing register on the rising edges or the falling edges of the first clock signal, the ones of the rising edges or the falling edges of the first clock signal on which the second video data signal is clocked from the first temporary storing register to the second temporary storing register being selected to provide sufficient set-up time and hold time for the second video data signal to be clocked from the first temporary storing register to the second temporary storing register. Preferably, the second video data signal is clocked from the first temporary storing register to the second temporary storing register by the first clock signal on the edges thereof which are opposite to the edges of the second clock signal on which the second video data signal is clocked into the first temporary storing register when the phase shift between the first and second clock signals lies within plus or minus a predetermined phase shift.

In one embodiment of the invention the interface circuit comprises a third temporary storing register, the second video data signal being clocked from the second temporary storing register to the third temporary storing register prior to being clocked into the video signal processing circuit, the second video data signal being clocked from the second temporary storing register to the third temporary storing register by the first clock signal on the ones of the rising or falling edges thereof similar to the rising or falling edges of the first clock signal on which the first video data signal is clocked into the video signal processing circuit, the second video data signal being clocked from the third temporary storing register to the video signal processing circuit.

In another embodiment of the invention a plurality of first signal temporary storing registers are provided in the interface circuit for accommodating clocking of the first video signal therethrough to the video signal processing circuit, the number of first signal temporary storing registers corresponding to the number of temporary storing registers in the interface circuit through which the second video data signal is clocked, the first video data signal being clocked through the first signal temporary storing registers by the first clock signal on the ones of the rising or falling edges of the first clock signal similar to the rising or falling edges of the first clock signal on which the first video data signal is clocked into the video signal processing circuit.

ADVANTAGES OF THE INVENTION

The advantages of the invention are many. The main advantage of the invention is that it enables the implementation of a digital video signal processor for processing digital video data signals as a single chip which permits two video data signals being clocked by respective different clock signals which are of identical frequency having a constant phase relationship to be simultaneously processed with a single clock signal, which therefore permits the circuit to be implemented with a single frequency multiplying circuit, rather than two separate frequency multiplying circuits, one for the processing of each video data signal. Accordingly, the video signal processor when implemented as an interpolator leads to significant savings.

Another advantage of the invention is that it provides a relatively simple solution to the problem of having to provide two frequency multiplying circuits for the respective different video data signals.

These and other advantages of the invention will be readily apparent to those skilled in the art from the following description of a preferred non-limiting embodiment thereof which is given by way of example only with reference to the accompanying drawings in which:

Figure 1:
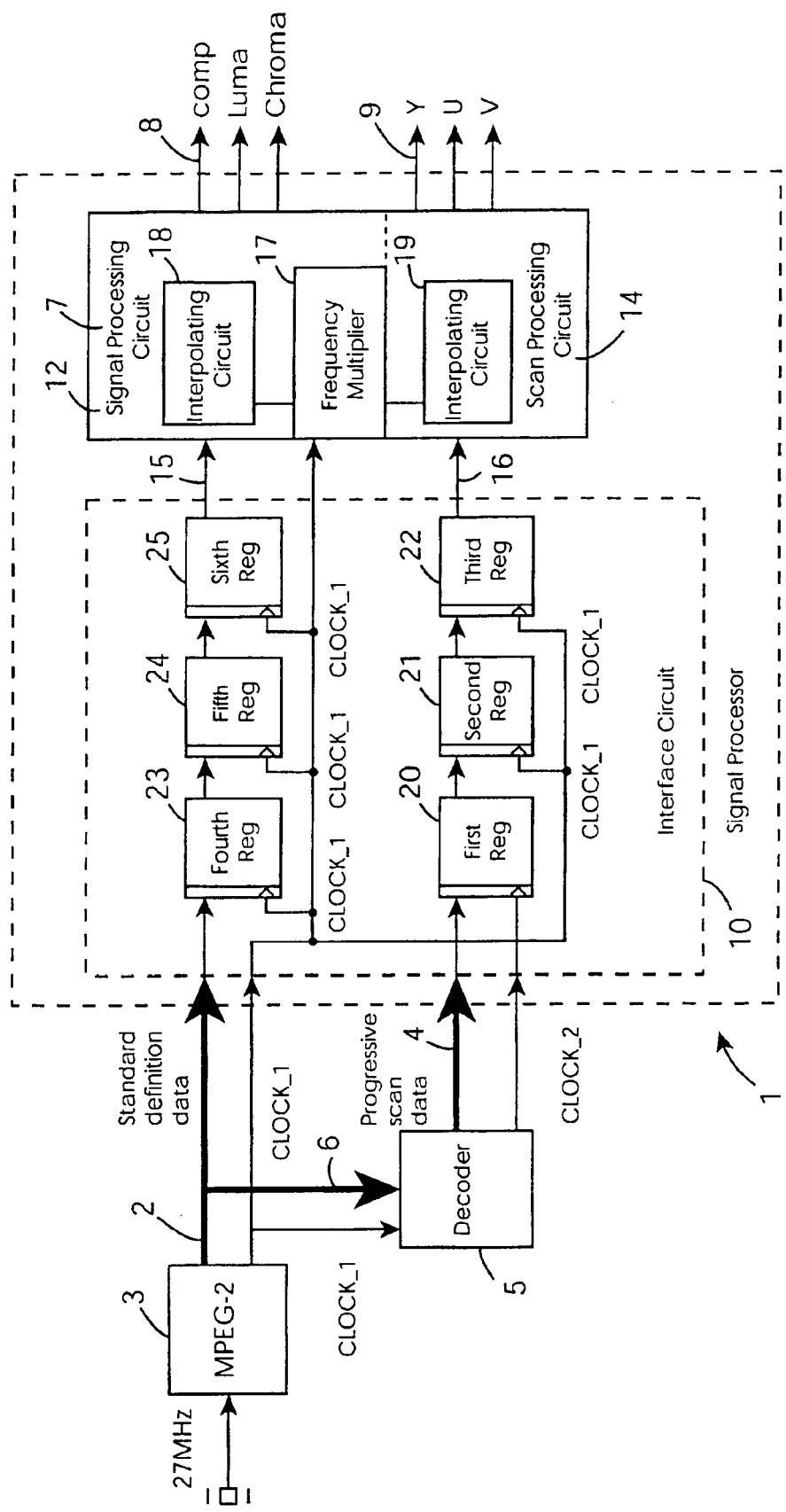
FIG. 1 is a block representation of a video signal processor according to the invention.

Referring to the drawings there is illustrated a digital video data signal processor according to the invention indicated generally by the reference numeral 1 for receiving first and second digital video data signals, in this embodiment of the invention digital video date signals in standard definition format and progressive scan format, respectively, and for outputting the video data signals in analogue form in both standard definition format and progressive scan format. The standard definition format digital video data signal is clocked on a ten bit bus 2 to the processor 1 from an MPEG-2 decoder 3 by a first clock signal, namely, CLOCK_1. The progressive scan format digital video data signal is clocked on a twenty bit bus 4 from a standard definition to progressive scan decoder 5 to the processor 1 by a second clock signal, namely, CLOCK_2 The standard definition video data signal is clocked on a ten bit bus 6 from the bus 2 by the first clock signal CLOCK_1 to the standard definition to progressive scan decoder 5 where it is converted to progressive scan format and clocked from the decoder 5 to the processor 1 on the bus 4. The clock rate of the first clock signal is 27 MHz. The second clock signal CLOCK_2 is derived from the first clock signal CLOCK_1 in the decoder 5, and is of identical frequency to the first clock signal CLOCK_1, namely, 27 MHz, however, the second clock signal CLOCK_2 may be phase shifted relative to the first clock signal CLOCK_1 in the standard definition to progressive scan decoder 5. Thus, while the second clock signal CLOCK_2 is of identical frequency to the first clock signal CLOCK_1, it may be out of phase with the first clock signal CLOCK_1. However, the phase relationship between the first and second clock signals CLOCK_1 and CLOCK_2 is constant.

The processor 1 is implemented as a single integrated circuit chip, and comprises a video signal processing circuit 7 in which the respective standard definition and progressive scan video data signals in digital form are processed and converted to analogue form and are outputted on output pins 8 and 9. The standard definition video data signals in analogue form is outputted on the three output pins 8, while the progressive scan video data signal in analogue form is outputted on the three pins 9.

The form in which the analogue forms of the standard definition and progressive scan signals are provided on the pins 8 and 9 will be well known to those skilled in the art. The processor 1 also comprises an interface circuit 10 which receives the standard definition and progressive scan digital video data signals on the buses 2 and 4, respectively, and interfaces the standard definition and progressive scan signals with the signal processing circuit 7. The interface circuit 10, as will be described below, interfaces the standard definition and progressive scan video data signals with the signal processing circuit 7, so that the digital video data signals in both the standard definition and the progressive scan formats are clocked into the signal processing circuit 7 on the same clock signal, namely, CLOCK_1, and furthermore, so that the video data signals in both the standard definition and progressive scan formats are clocked into the video signal processing circuit 7 on the same edges of the clock signal CLOCK_1, which in this embodiment of the invention is the rising edges of the first clock signal CLOCK_1. The signal processing circuit 7 and the interface circuit 10 are implemented as a single integrated circuit chip.

The video signal processing circuit 7 comprises a standard definition processing circuit 12 and a progressive scan processing circuit 14, both of which can simultaneously convert the respective standard definition and progressive scan video data signals to respective analogue forms. The standard definition video data signal is clocked on a ten bit bus 15 from the interface circuit 10 to the standard definition processing circuit 12 by the first clock signal CLOCK_1. The progressive scan video data signal is clocked by the first clock signal CLOCK_1 on a twenty bit bus 16 to the progressive scan processing circuit 14. A frequency multiplier circuit 17 in the video signal processing circuit 7 receives the first clock signal CLOCK_1 and multiplies the first clock signal CLOCK_1 to provide appropriate clock signals to interpolating circuits 18 and 19 in the standard definition and progressive scan processing circuits 12 and 14, respectively, for interpolating the respective standard definition and progressive scan video data signals during the conversion process from digital to analogue form. The interpolation and digital to analogue conversion circuitry of such processing circuits will be well known to those skilled in the art, and it is not intended to describe this part of the circuitry in further detail. However, the important aspect of the invention is the fact that only a single frequency multiplier circuit 17 is required, since both the standard definition and progressive scan video data signal are clocked into the video signal processing circuit 7 by the first clock signal CLOCK_1.

Turning now to the interface circuit 10, the interface circuit 10 comprises first, second and third temporary storing registers, namely, a first register 20, a second register 21 and a third register 22 through which the progressive scan video data signals are sequentially clocked through the interface circuit 10. The interface circuit 10 also comprises three first signal temporary storing registers, namely, fourth, fifth and sixth registers, 23, 24 and 25, respectively, through which the standard definition video data signals are sequentially clocked through the interface circuit 10. The standard definition video data signal is clocked by the first clock signal CLOCK_1 through the fourth, fifth and sixth registers 23 to 25 on the rising edges of the first clock signal CLOCK_1. The standard definition video data signals are then clocked from the sixth register 25 into the video signal processing circuit 7 by the first clock signal CLOCK_1, and also on the rising edges of the first clock signal CLOCK_1.

The progressive scan video data signal is clocked into the first register 20 by the second clock signal CLOCK_2 on the rising edges of the second clock signal CLOCK_2. The progressive scan video data signal is then clocked from the first register 20 to the second register 21 by the first clock signal CLOCK_1. The progressive scan video data signal may be clocked from the first register 20 to the second register 21 on the rising edges or the falling edges of the first clock signal CLOCK_1, and the edges on which the progressive scan video data signal is clocked from the first register 20 to the second register 21 is dependent on the phase shift between the second clock signal CLOCK_2 and the first clock signal CLOCK_1 as will be described below. The progressive scan video data signal is clocked from the second register 21 to the third register 22 by the first clock signal CLOCK_1 on the rising edges of the first clock signal CLOCK_1. Thereafter the progressive scan video data signal is clocked from the third register 22 into the video signal processing circuit 7 by the first clock signal CLOCK_1 on the rising edges thereof.

Figure 2:
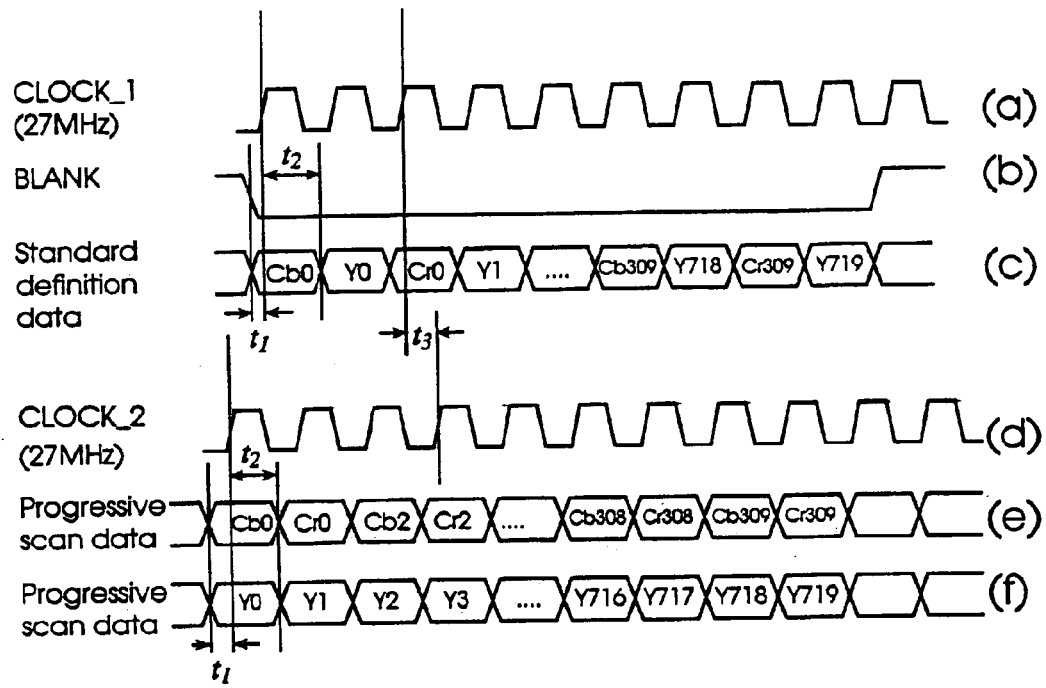
FIG. 2 is a timing diagram illustrating the clocking of video signals in the video signal processor of FIG. 1.

Returning now to the clocking of the progressive scan video data signal from the first register 20 to the second register 21, the edges of the first clock signal CLOCK_1 on which the data is clocked from the first register 20 to the second register 21 is selected so that the set-up time $t_1$ and hold time $t_2$ of the video data signal available to the second register 21 is sufficient for facilitating clocking of the video data signal from the first register 20 to the second register 21, see FIG. 2. Whether the set-up and hold times are sufficient is determined by the phase shift between the second clock signal CLOCK_2 and the first clock signal CLOCK_1.

Figure 3:
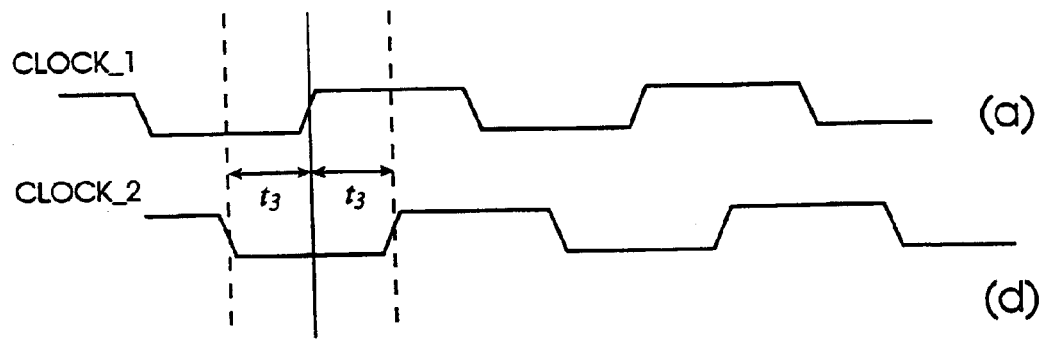
FIG. 3 is an enlarged view of a portion of the timing diagram of FIG. 2.

Referring in particular to FIGS. 2 and 3 the clocking of the standard definition and progressive scan video data signals by the respective first clock signal CLOCK_1 and the second clock signal CLOCK_2 is illustrated. The clock signal (a) is the first clock signal CLOCK_1 of the standard definition video data signal. The signal (b) represents the blank signal of the standard definition video data, while the data signal (c) represents the data of the standard definition video data. The clock signal (d) is the second clock signal, namely, CLOCK_2 of the progressive scan video data signal while the data signals (e) and (f) are the data signals of the progressive scan video data. If the phase shift between the second clock signal CLOCK_2 and the first clocks signal CLOCK_1 is within plus or minus a predetermined phase shift then the progressive scan video data signal is clocked from the first register 20 to the second register 21 on the falling edges of the first clock signal CLOCK_1. However, once the phase shift is outside plus or minus the predetermined phase shift the progressive scan video data signal is clocked from the first register 20 to the second register 21 on the rising edges of the first signal CLOCK_1. In this embodiment of the invention the predetermined phase shift is one quarter of the clock cycle of the first clock signal CLOCK_1, and thus, when the phase shift between the first and second clock signals is within plus or minus one quarter of the cycle of the first clock signal CLOCK_1 the progressive scan video data signal is clocked from the first register 20 to the second register 21 on the falling edges of the first clock signal CLOCK_1. Otherwise, the progressive scan video data signal is clocked from the first register 20 to the second register 21 on the rising edges of the first clock signal CLOCK_1. Since the first clock signal is of frequency of 27 MHz the cycle time of each clock signal is approximately 38 nanoseconds. Thus, should the second clock signal CLOCK_2 lag or lead the first clock signal CLOCK_1 by a time $t_3$ of 9.25 nanoseconds in order to allow sufficient set-up and hold time for the progressive scan video data signal, the video data signal is clocked from the first register 20 to the second register 21 on the falling edges of the first clock signal CLOCK_1.

By clocking the standard definition video data signal through the same number of registers, namely, the fourth, fifth and sixth registers 23, 24 and 25, the standard definition and progressive scan video data signals remain in time with each other in the interface circuit 10.

A circuit (not shown) is provided for selecting the edges of the first clock signal on which the progressive scan video data signals are clocked from the first register 20 to the second register 21. Such circuits will be well known to those skilled in the art. Additionally, the circuit for selecting which of the edges of the first clock signal CLOCK_1 on which the video data signal is to be clocked from the first register 20 to the second register 21 may be responsive to a detecting circuit for detecting the phase shift between the second clock signal CLOCK_2 and the first clock signal CLOCK_1. Such a detecting circuit would compare the detected phase shift between the first and second clocks CLOCK_1 and CLOCK_2 with a reference phase shift, and the rising or falling edges of the first clock signal CLOCK_1 on which the progressive scan video data signal is to be clocked from the first register 20 to the second register 21 would be selected in response to the comparison. Such phase shift detecting circuitry will be well known to those skilled in the art. Alternatively, since the phase shift between the first and second clock signals CLOCK_1 and CLOCK_2 will at all times be constant, the circuit for selecting on which of the rising edges or falling edges the video data signal is to be clocked from the first register 20 to the second register 21 may be manually set.

Additionally, where the selection of the rising or falling edges of the first clock signal CLOCK_1 on which the progressive scan video data signal is to be clocked from the first register 20 to the second register 21 is to be manually determined, a one bit register may be provided for determining which of the rising or falling edges of the first clock signal CLOCK_1 the progressive scan video data signal is to be clocked from the first register 20 to the second register 21. The single bit in the one bit register could be set to one where the progressive scan video data signal is to be clocked from the first register 20 to the second register 21 on the rising edges of the first clock signal CLOCK_1, and could be set to zero for clocking the progressive scan video data signal from the first register 20 to the second register 21 on the falling edges of the first clock signal CLOCK_1. Indeed, where the rising or falling edges of the first clock signal CLOCK_1 on which the progressive scan video data signal is to be clocked from the first register 20 to the second register 21 is to be automatically selected, the circuit for determining the phase shift between the respective clock signals CLOCK_1 and CLOCK_2 would merely select the bit value of the bit in the single bit register.

In use, the standard definition video data signal is clocked into the MPEG-2 decoder 3 on the first clock signal CLOCK_1 and decoded therein and clocked to the interface circuit 10 on the first clock signal CLOCK_1. The standard definition video data signal is clocked into the standard definition to progressive scan decoder 5 which converts the standard definition video data signal to a progressive scan video data signal, which in turn is clocked to the interface circuit 10 on the second clock signal CLOCK_2. The standard definition video data signal is clocked into the standard definition to progressive scan decoder 5 on the first clock signal CLOCK_1, and the second clock signal CLOCK_2 is derived from the first clock signal CLOCK_1, and is of identical frequency to the first clock signal CLOCK_1 but in general, is out of phase but has a constant phase relationship with the first clock signal CLOCK_1. The standard definition and progressive scan video data signals are clocked through the interface circuit 10 so that both video data signals are clocked into the video signal processing circuit 7 on the same clock signal, namely, the first clock signal CLOCK_1, and on the rising edges of the first clock signal. The frequency of the first clock signal CLOCK_1 is multiplied by the frequency multiplier circuit 17 in the video signal processing circuit 7 for providing clock signals to the interpolating circuits 18 and 19 of the standard definition processing circuit 12 and the progressive scan processing circuit 14 for interpolating the respective video data signals during the conversion process of the digital video data signals to analogue form. The standard definition video data signals in analogue form are outputted on the three output pins 8 while the progressive scan video data signals in analogue form are outputted on the three output pins 9.

While the standard definition video data signal has been described as being clocked into the interface circuit on the rising edges of the first clock signal, the standard definition video data signal could be clocked into the interface circuit on the falling edges of the first clock signal CLOCK_1. However, in such a case, the standard definition and progressive scan video data signals would in general be clocked from the interface circuit to the video signal processing circuit on the falling edges of the first clock signal CLOCK_1. Additionally, while the progressive scan video data signal has been described as being clocked into the interface circuit on the rising edges of the second clock signal, in certain cases it is envisaged that the progressive scan video data signal may be clocked into the interface circuit on the falling edges of the second clock signal CLOCK_2, however, this should not alter the edges of the first clock signals on which the standard definition video data signal is clocked into the interface circuit and from the interface circuit to the video signal processing circuit, nor should it affect the edges on which the progressive scan video data signal is clocked from the interface circuit to the video signal processing circuit. However, the edges on which the progressive scan video data signal is clocked from the first register to the second register may have to be altered in order to allow a sufficient set-up time and hold time for the progressive scan video signal data in order to permit capture of the video data signal by the second register.

It is also envisaged that while the standard definition and progressive scan signals have been described as being clocked into the signal processing circuit on the first clock signals, it will of course be appreciated by those skilled in the art that the standard definition and progressive scan video data signals may be clocked into the signal processing circuit on the second clock signal. In which case the standard definition video data signal would be clocked into the first register 20 on the first clock signal, and would be clocked through the second and third registers 21 and 22 on the second clock signal. The progressive scan video data signal would be clocked on the second clock signal through the registers 23, 24 and 25.

It is also envisaged that bus sizes other than those described may be used. For example, it is envisaged that the buses 2, 6 and 15 may be of eight bit, ten bit, sixteen bit or indeed twenty bit size buses, while the buses 4 and 16 may likewise be of eight, ten, sixteen or twenty bit size buses.

While the MPEG-2 decoder and the standard definition to progressive scan decoders have been described as being separate units from the digital video data signal processor, in certain cases, it is envisaged that they may be implemented on the same integrated circuit chip.

What is claim is:

1. A method for processing respective first and second digital video data signals in a video signal processor, wherein the first video data signal is clocked by a first clock signal, and the second video data signal is clocked by a second clock signal, the first and second clock signals being of identical frequency and having a constant phase relationship, the method comprising the steps of:

clocking the first video data signal into an interface circuit by the first clock signal on either the rising edges or the falling edges thereof, clocking the second video data signal into the interface circuit by the second clock signal on either the rising edges or the falling edges thereof, clocking the first video data signal from the interface circuit to the video signal processor by the first clock signal on either the rising edges or the falling edges thereof, clocking the second video data signal from the interface circuit to the video signal processor by the first clock signal on the ones of the rising edges or falling edges thereof similar to the edges of the first clock signal on which the first video data signal is clocked from the interface circuit to the video signal processor so that interpolation of both the first video data signal and the second video data signal can be carried out in the video signal processor with a frequency multiple of the first clock signal.

2. A method as claimed in claim 1 in which the first video data signal is one of a standard definition video data signal, and a progressive scan video data signal, and the second video data signal is the other of the standard definition video data signal and the progressive scan video data signal.

3. A method as claimed in claim 1 in which the first video data signal is a standard definition video data signal, and the second video data signal is a progressive scan video data signal.

4. A method as claimed in claim 1 in which the frequency of the first and second clock signals lie in the range 24 MHz to 38 MHz.

5. A method as claimed in claim 1 in which the frequency of the first and second clock signals are approximately 27 MHz.

6. A method as claimed in claim 1 in which the first video data signal is clocked from the interface circuit to the video signal processor on the ones of the rising edges or the falling edges similar to the edges of the first clock signal on which the first video data signal is clocked by the first clock signal to the interface circuit.

7. A method as claimed in claim 1 in which the interface circuit comprises a first temporary storing register and a second temporary storing register, the second video data signal being clocked into the first temporary storing register by the second clock signal, and being clocked from the first temporary storing register to the second temporary storing register on the rising edges or the falling edges of the first clock signal, the ones of the rising edges or the falling edges of the first clock signal on which the second video data signal is clocked from the first temporary storing register to the second temporary storing register being selected to provide sufficient set-up time and hold time for the second video data signal to be clocked from the first temporary storing register to the second temporary storing register.

8. A method as claimed in claim 7 in which the second video data signal is clocked from the first temporary storing register to the second temporary storing register by the first clock signal on the edges thereof which are opposite to the edges of the second clock signal on which the second video data signal is clocked into the first temporary storing register when the phase shift between the first and second clock signals lies within plus or minus a predetermined phase shift.

9. A method as claimed in claim 8 in which the predetermined phase shift is within plus or minus one-third of one cycle of the first clock signal.

10. A method as claimed in claim 8 in which the predetermined phase shift is within plus or minus a quarter of one cycle of the first clock signal.

11. A method as claimed in claim 7 in which the second video data signal is clocked from the second temporary storing register to a third temporary storing register prior to being clocked into the video signal processor, the second video data signal being clocked from the second temporary storing register to the third temporary storing register by the first clock signal on the ones of the rising or falling edges thereof similar to the rising or falling edges of the first clock signal on which the first video data signal is clocked into the video signal processor, the second video data signal being clocked from the third temporary storing register to the video signal processor.

12. A method as claimed in claim 7 in which the second video data signal is clocked into the first temporary storing register by the second clock signal on the rising edges or the falling edges thereof similar to the edges of the first clock signal on which the first video data signal is clocked into the video signal processor.

13. A method as claimed in claim 1 in which the first video data signal is clocked through a plurality of temporary storing registers in the interface circuit by the first clock signal on the edges of the first clock signal similar to the edges of the first clock signal on which the first video data signal is clocked into the video signal processor, the number of temporary storing register through which the first clock signal is clocked in the interface circuit corresponding to the number of temporary storing registers in the interface circuit through which the second clock signal is clocked.

14. A video signal processor for processing respective first and second digital video data signals, the first video data signal being clocked by a first clock signal, and the second video data signal being clocked by a second clock signal, the first and second clock signals being of identical frequency, and having a constant phase relationship, the video signal processor comprising:
a video signal processing circuit for interpolating the first and second video data signals,
a frequency multiplier in the video signal processing circuit for multiplying the frequency of a clock signal for interpolating the first and second video data signals in the video signal processing circuit, and
an interface circuit for interfacing the respective first and second video data signals with the video signal processing circuit, the first video data signal being clocked into the interface circuit by the first clock signal on the rising or falling edges thereof, and subsequently being clocked from the interface circuit to the video signal processing circuit by the first clock signal on the rising or falling edges thereof, the second video data signals being clocked into the interface circuit by the second clock signal on the rising or falling edges thereof, and subsequently being clocked from the interface circuit to the video signal processing circuit by the first clock signal on the ones of the rising or falling edges thereof similar to the rising or falling edges of the first clock signal on which the first video data signal is clocked from the interface circuit to the video signal processing circuit so that interpolation of both the first video data signal and the second video data signal can be carried out in the video signal processing circuit with a frequency multiple of the first clock signal derived from the first clock signal by the frequency multiplier.

15. A processor as claimed in claim 14 in which the interface circuit comprises a first temporary storing register and a second temporary storing register, the second video data signal being clocked into the first temporary storing register by the second clock signal, and being clocked from the first temporary storing register to the second temporary storing register on the rising edges or the falling edges of the first clock signal, the ones of the rising edges or the falling edges of the first clock signal on which the second video data signal is clocked from the first temporary storing register to the second temporary storing register being selected to provide sufficient set-up time and hold time for the second video data signal to be clocked from the first temporary storing register to the second temporary storing register.

16. A processor as claimed in claim 15 in which the second video data signal is clocked from the first temporary storing register to the second temporary storing register by the first clock signal on the edges thereof which are opposite to the edges of the second clock signal on which the second video data signal is clocked into the first temporary storing register when the phase shift between the first and second clock signals lies within plus or minus a predetermined phase shift.

17. A processor as claimed in claim 16 in which the predetermined phase shift is within plus or minus one-third of one cycle of the first clock signal.

18. A processor as claimed in claim 16 in which the predetermined phase shift is within plus or minus a quarter of one cycle of the first clock signal.

19. A processor as claimed in claim 15 in which the interface circuit comprises a third temporary storing register, the second video data signal being clocked from the second temporary storing register to the third temporary storing register prior to being clocked into the video signal processing circuit, the second video data signal being clocked from the second temporary storing register to the third temporary storing register by the first clock signal on the ones of the rising or falling edges similar to the rising or falling edges of the first clock signal on which the first video data signal is clocked into the video signal processing circuit, the second video data signal being clocked from the third temporary storing register to the video signal processing circuit.

20. A processor as claimed in claim 15 in which the second video data signal is clocked into the first temporary storing register by the second clock signal on the rising edges or the falling edges thereof similar to the rising or falling edges of the first clock signal on which the first video data signal is clocked into the video signal processing circuit.

21. A processor as claimed in claim 14 in which the first video data signal is clocked from the interface circuit to the video signal processing circuit on the ones of the rising edges or the falling edges similar to the rising or falling edges of the first clock signal on which the first video data signal is clocked by the first clock signal to the interface circuit.

22. A processor as claimed in claim 14 in which the first video data signal is one of a standard definition video data signal, and a progressive scan video data signal, and the second video data signal is the other of the standard definition data signal and the progressive scan video data signal.

23. A processor as claimed in claim 14 in which the first video data signal is a standard definition video data signal and the second video data signal is a progressive scan video data signal.

24. A processor as claimed in claim 14 in which the frequency of the first and second clock signals lies in the range 24 MHz to 38 MHz.

25. A processor as claimed in claim 14 in which the frequency of the first and second clock signals is approximately 27 MHz.

26. A processor as claimed in claim 14 in which a plurality of first signal temporary storing registers are provided in the interface circuit for accommodating clocking of the first video signal therethrough to the video signal processing circuit, the number of first signal temporary storing registers corresponding to the number of temporary storing registers in the interface circuit through which the second video data signal is clocked, the first video data signal being clocked through the first signal temporary storing registers by the first clock signal on the ones of the rising or falling edges of the first clock signal similar to the rising or falling edges of the first clock signal on which the first video data signal is clocked into the video signal processing circuit.

* * * * *